United States Patent [19]
Jensen

[11] Patent Number: 5,332,865
[45] Date of Patent: Jul. 26, 1994

[54] LINE GUIDING ASSEMBLY

[75] Inventor: Theodore E. Jensen, Scottsdale, Ariz.

[73] Assignee: W. L. Gore & Associates, Inc., Newark, Del.

[21] Appl. No.: 955,568

[22] Filed: Oct. 2, 1992

[51] Int. Cl.$^5$ .......................................... H02G 11/00
[52] U.S. Cl. ................................. 174/99 E; 174/98; 59/78.1; 191/12 R; 191/12 C; 198/841
[58] Field of Search ................ 174/69, 98, 99 E; 59/78, 78.1; 198/841; 191/12 C, 12 R; 254/134.3 FT

[56] References Cited

U.S. PATENT DOCUMENTS

| | | | |
|---|---|---|---|
| 3,332,434 | 7/1967 | Stahmer | 191/12 C |
| 3,630,325 | 12/1971 | Corl et al. | 191/126 |
| 3,779,003 | 12/1973 | Boissevain et al. | 59/78.1 |
| 4,545,621 | 10/1985 | Sharp | 174/69 X |

FOREIGN PATENT DOCUMENTS

| | | | |
|---|---|---|---|
| 0490022 | 6/1992 | European Pat. Off. | 191/12 R |
| 3300495 | 7/1983 | Fed. Rep. of Germany | 191/12 R |
| 0708451 | 1/1980 | U.S.S.R. | 191/12 R |
| 1492407 | 7/1989 | U.S.S.R. | 191/12 R |
| 1534596 | 1/1990 | U.S.S.R. | 191/12 R |
| 937820 | 3/1961 | United Kingdom | |

OTHER PUBLICATIONS igus bearing, Inc., "Innovative Cable and Hose Carriers", Oct., 1987, p. 5.

Primary Examiner—Lincoln Donovan
Assistant Examiner—Hyung S. Sough
Attorney, Agent, or Firm—Dena M. Weker

[57] ABSTRACT

This invention relates to a line guiding assembly comprising a line guiding trough and a line assembly guided therein which includes a plurality of ribbon cables held within an encapsulant and reinforcement channels. The line assembly forms a loop with a lower length and an upper length. A ribbon material either in a drum or coil is provided that fits inside the loop wherein the coil of ribbon material is between the upper and lower lengths of the line reinforced assembly and extends and retracts in the same direction as the movement of the loop and lengths of the assembly. The ribbon material is different from the material of the line assembly and is preferably stainless steel. A double ended system with two line assemblies operating in a single trough is also provided.

11 Claims, 4 Drawing Sheets

LINE GUIDING ASSEMBLY

FIELD OF THE INVENTION

This invention relates to a line guiding assembly comprising a trough assembly and a line assembly guided therein. The line assembly includes a plurality of cables held within an encapsulant which is further contained within reinforcement channels. The line assembly forms a loop within the trough thereby creating a lower length of the reinforced assembly and an upper length of the reinforced assembly. A ribbon material provided either on a roll drum or coil is provided and fits inside the loop wherein the ribbon material provides a contact area intermediate and between the upper and lower lengths of reinforced assembly. The intermediate ribbon material is capable of moving with the upper length of reinforced assembly as it travels or remains fixed and stationary with the lower length. The ribbon material is made from a material that is different from that of the line assembly and is preferably stainless steel.

Another embodiment is provided for a double ended system wherein two line assemblies operate in a single trough.

BACKGROUND OF THE INVENTION

It is often required to provide a connection between a piece of equipment which is in linear motion, such as a robot and a stationary piece of equipment, such as a control panel wherein the connection does not hinder the motion of the moving piece of equipment and wherein the reliability of the connection is adequate and sufficiently durable to sustain the system through a large number of motions.

A line guiding assembly which accomplishes these objectives includes U.S. Ser. No. 07/807,018. Although the connection of this line guiding assembly is sufficiently durable, when this assembly is used for long intervals, debris is generated by the abrasion at the surfaces of the upper and lower lengths as they travel against each other. This debris may collect in the area surrounding the line guiding assembly and may be cosmetically undesirable and/or the debris may serve as an airborne carrier of static charge which may be unacceptable in certain applications.

The line guiding assembly of U.S. Ser. No. 07/807,018 also requires a large driving force to overcome the static friction that exists between the upper and lower lengths and put the mobile piece of equipment into motion.

There is a need to improve the line guiding assembly to eliminate the creation of debris and provide a system where a lesser driving force to move the mobile piece of equipment is provided.

SUMMARY OF THE INVENTION

A line guiding assembly is provided with a ribbon material that is dissimilar from the material comprising the line assembly of an encapsulant holding a plurality of cables or the reinforcement channels holding the encapsulant. This ribbon material may extend and retract in the same direction and in an amount relative to the movement of the line assembly or may remain stationary so long as it provides a contact area between upper and lower lengths of the line assembly.

The line assembly comprises a plurality of cables in which the longitudinal axis of each cable is coplanar with the longitudinal axes of the other cables and wherein all of the cables are contained within an extruded encapsulant. The encapsulant material containing the cables is held within reinforcement channels. The line assembly (cables, encapsulant and reinforcement channels) is positioned within a trough assembly.

One end of the line assembly is fastened to a stationary piece of equipment. The other end is fastened to a piece of equipment which is designed so as to move back and forth with respect to the stationary equipment in a linear manner. Between these two ends, the line assembly extends in the trough along its longitudinal axis and forms a loop on itself so that the two ends of the assembly actually lay upon each other thereby causing an upper length and a lower length of the reinforced line assembly. The loop moves linearly in the direction of motion of the moving piece of equipment. The reinforcement channel is preferably made of a polymeric material such as a polyamide or a composite of polyamide and a fluoropolymer.

Within the loop created between the two ends of the line assembly lies the coil or drum of a ribbon material which is flat and is made of a material different from that of the polymeric material of the line assembly. A preferable material is a hard material such as stainless steel. The roll of hard material should be capable of movement, moves relative to the movement of the upper and lower lengths and serves as a buffer between them so that the lengths do not touch each other. Thus as the upper and lower lengths move to carry out the movement of the mobile equipment, the lengths slide against the hard ribbon material instead of each other.

Alternatively, a hoop or drum surrounded by a ribbon of hard material may be used rather than the coil. In this embodiment the extended ribbon also maintains its position between the upper and lower lengths. The ribbon may be wound around the hoop or drum as the moving length retracts; likewise the ribbon may extend as the moving length extends away from the loop. The hard material may be stainless steel as described in the first embodiment.

A double ended system also provided wherein two line assemblies operate in a single trough. Also a dual line guiding assembly, both operating in the same direction is also provided.

DETAILED DESCRIPTION OF THE PREFERRED EMBODIMENTS

Figure 1:
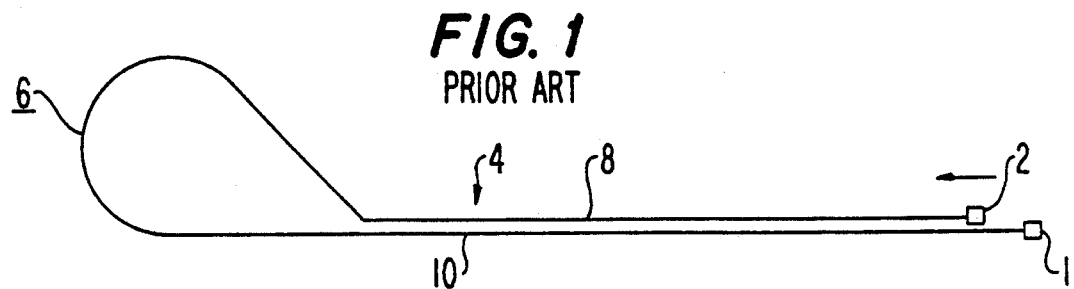
FIG. 1 shows a side view of an existing line guiding assembly.

An improved line guiding assembly is provided comprising a line guiding trough and a line assembly guided therein. The line assembly includes a plurality of cables contained within an extruded encapsulant. The encapsulant and cables are further contained within reinforcement channels. The term "cables" encompasses both electrical and nonelectrical applications and includes utilization of electrical cables, tubes, and fiber optic cables. The line assembly is located within the trough. The encapsulant, cables, and reinforcement channels are laid back onto themselves thereby forming a loop and an upper and lower length of the reinforced assembly. The loop moves linearly within the trough in the direction of the moving piece of equipment but at approximately one-half the speed of the moving piece of equipment. FIG. 1 shows a side view of the existing line guiding assembly without the additional features described in the present application. As shown in FIG. 1, a schematic side view of an existing line guiding assembly is provided having a moving piece of equipment 2 attached to a plurality of cables contained within the encapsulant and reinforcement channels 4. The figure also shows loop 6 and upper reinforced assembly 8 and lower reinforced assembly 10. In this assembly, as the moving object 2 moves in the direction of the arrow towards the loop, the upper length 8 moves in a similar direction and rubs against the lower length 10 thereby causing a substantial amount of abrasion. The lower length 10 is attached to a stationary piece of equipment 1.

Figure 2:
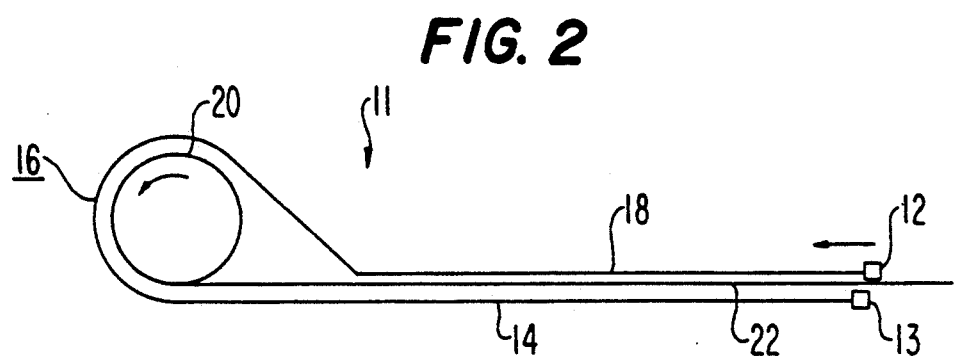
FIG. 2 shows a side view of a first embodiment of the line guiding assembly provided with a drum and ribbon on which the ribbon rolls around the drum.

The present invention is shown in FIG. 2 which is a schematic side view of the line guiding assembly 11 provided with a drum 20 of ribbon material 22 positioned within the loop 10. As can be seen in FIG. 2, a line guiding assembly 11 similar in shape to that shown in FIG. 1 is provided in which a moving piece of equipment 12 is attached to a plurality of cables contained within an reinforcement channel. A stationary piece of equipment 13 is attached to the opposite end of the cables.

The line assembly (cables, encapsulant and reinforcement channels) is positioned in a manner so that an upper length 18 attached to the moving object 12, a loop 16 and a lower length 14 attached to a stationary piece of equipment are created. Disposed within the loop 16 is a drum that has the ribbon material 22 attached thereto. The ribbon is attached to the drum by suitable means such as an adhesive bond, screws, a welded bond, or rivets. The exposed end of the ribbon material 22 is attached to the trough bottom at a length of the line assembly 14. Alternatively, the exposed end of the ribbon material may be attached directly to the lower length 14 of the reinforced assembly. The ribbon 22 is approximately the width of the upper 18 and lower 14 lengths, is sufficiently thin to maintain flexibility and durability and is positioned intermediate between the upper and lower lengths and to such a degree that the ribbon 22 extends the entire area that the upper 18 and lower 14 lengths would be in contact. Thus any contact of the upper and lower lengths is with the ribbon 22 rather than the lengths themselves.

Figure 2A:
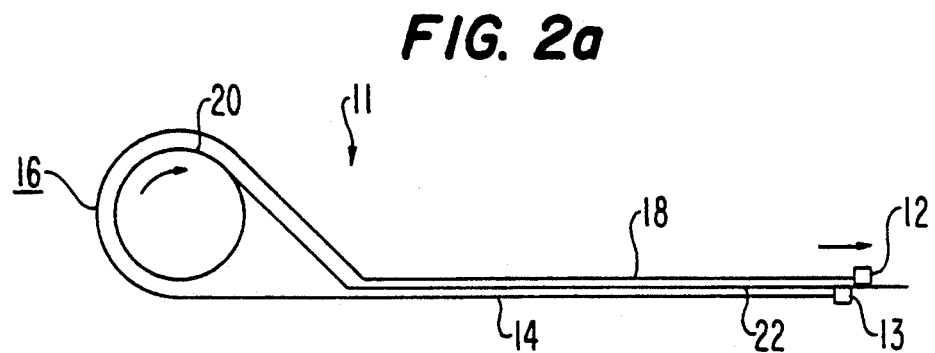
FIG. 2a shows a side view of the first embodiment with the ribbon end attached to the upper length of the assembly.

In this embodiment, as the loop 16 moves linearly in the direction of the moving piece of equipment 12, the drum 20 rotates and moves in a similar fashion. As the drum 20 rotates in the direction of the arrow, thereby increasing the lower length 14 of reinforced cable, the length of intermediate ribbon 22 also increases in length to cover the entire contact area between the upper length 18 and lower length 14. Conversely, as the moving object 12 moves in the opposite direction and the loop 16 moves in the direction of the moving object and thus shortens the length of the lower length 14, the drum similarly rotates in the opposite direction and the length of material rolls around the drum 20 so as to shorten in length. Here the ribbon material is coiled as shown in FIG. 2a so that the exposed end of the ribbon material may be attached to the upper length 18 of the reinforced assembly carrying the moving object 12. Similar to the movement in the first direction however, the entire contact area between upper and lower lengths is buffered by the intermediate ribbon 22.

Figure 3:
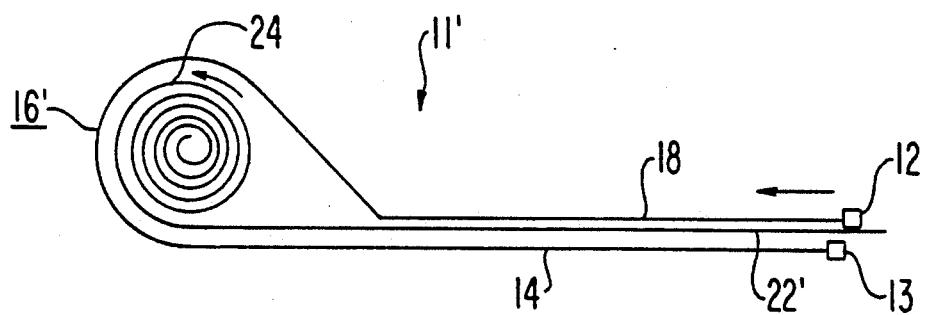
FIG. 3 shows a side view of a second embodiment of the line guiding assembly provided with a coil of ribbon in which the ribbon wraps or rolls about itself.

FIG. 3 shows another embodiment of the improved cable assembly. In this embodiment, a coil or roll 24 of ribbon material 22' is used in place of the drum with ribbon material 22. The movement of the coil 24 is similar to that of the drum such that as the loop and coil move laterally in the direction of the moving object (and arrow), the coil unwinds, the flattened ribbon material 22' extends between the upper and lower lengths.

Conversely, as the loop 16 moves in the opposite direction toward the moving object, the coil of flattened material similarly moves in the same direction (opposite to the direction shown in the figure) so that the flattened material winds up and shortens in length as the lower length of the reinforced cable 14 becomes shorter. Here again, and similar to that shown in FIG. 2a, the exposed end of the ribbon material may be attached to the upper length of the reinforced assembly carrying the moving object 12.

Figure 4:
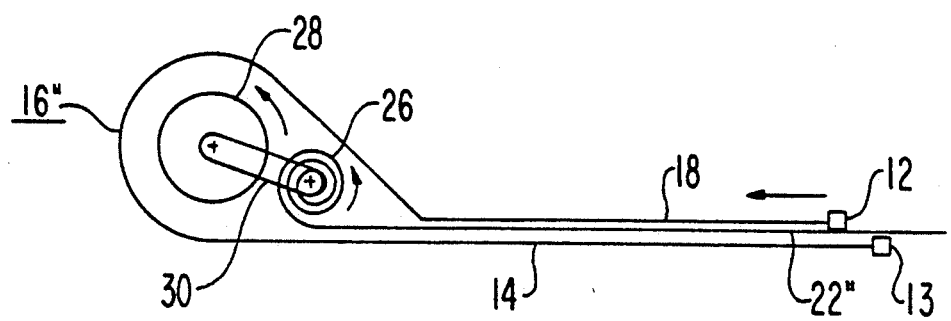
FIG. 4 shows a side view of an alternate embodiment of the line guiding assembly provided with a drum and coil of flat ribbon material.

Yet another embodiment, as shown in the schematic side view of FIG. 4 involves both a rolling drum 28 with affixed coil 26 of ribbon material 22" disposed within the loop 16" such that the motion of the drum and coil are synchronized by a pulley 30 operating between them. Similar to the other embodiments, as the moving object moves in the direction of the arrow shown in FIG. 4, the loop 16" also moves in the same direction. The drum 28 rotates counterclockwise causing the coil 26 of flattened material to also roll counterclockwise thus unwinding the flattened ribbon 22" so that it is intermediately between upper 18 and lower 14 lengths of reinforced cable.

Figure 5:
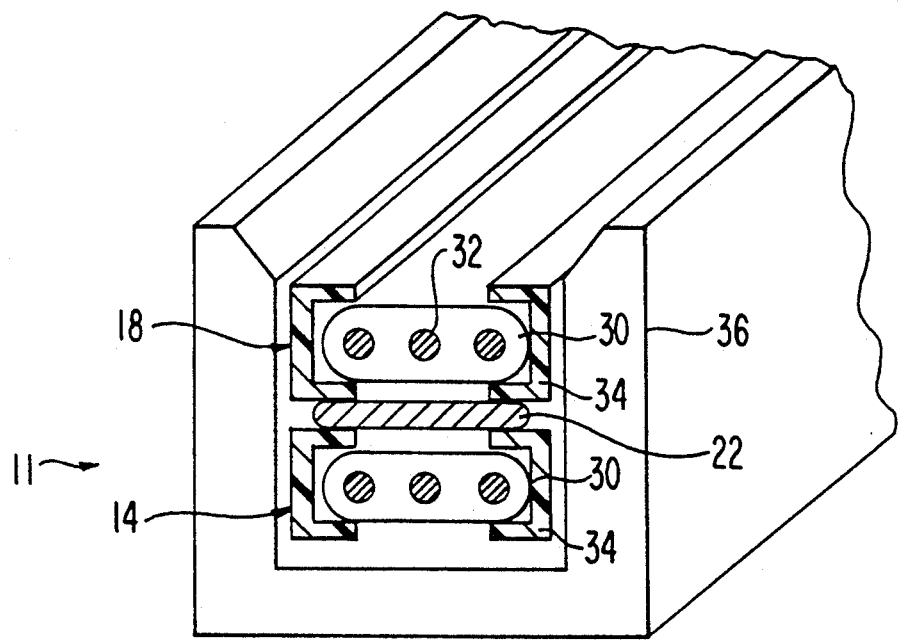
FIG. 5 shows a cross-sectional view of the line guiding assembly with the ribbon located between the upper and lower lengths of the assembly cable all of which is positioned with a trough or channel in which the line guiding assembly is operating.

FIG. 5 shows a cross-sectional end view of the line guiding assembly with ribbon material 22 at a position along the assembly where the upper 18 and lower 14 lengths are in close contact but are separated by the ribbon material. This view is applicable to any of the embodiments described above.

In this figure, the line guiding assembly is shown having upper reinforced assembly 18 and lower 14 reinforced assembly. The assemblies comprise a plurality of cables 32 held within an extruded encapsulant to form an encapsulated line 30. This encapsulated line is further disposed between reinforcement channels 34 thereby forming a reinforced assembly. Positioned intermediate the two upper and lower reinforced assemblies is the ribbon material 22 which is of a different material composition from the reinforced line assemblies. The reinforced line assembly (reinforced channels 34, encapsulant 30 and cables 32) operates within a trough 36 which enables smooth motion along its linear path.

The encapsulant 30 surrounding the plurality of cables is typically comprised of a polyurethane. The reinforcement channels 34 containing the encapsulated cables 30 are typically made of a composite of polyaramide and a fluoropolymer, such as polytetrafluoroethylene (PTFE), fluorinated ethylene propylene (FEP) and perfluoroalkoxy resin (PFA). The line reinforcement channels 34 with encapsulated cable comprise the upper and lower lengths and loop which linearly move back and forth in the trough 36 as described above. The trough 36 is made of metal and is lined with an ultra-high molecular weight polyethylene, stainless steel or other suitable material.

Located intermediate the upper 18 and lower 14 lengths is the flat ribbon material 22. This ribbon must be comprised of a material different from the polymeric material of the channels. The ribbon is comprised of a material substantially harder than the polymeric material of the channel and is preferably a smooth metal such as stainless steel. Other suitable materials for the ribbon include beryllium copper, stiff hard polymers such as polyimides, cold rolled steel, and hard chrome plated steel. Regardless of the ribbon material chosen, it must be hard enough to minimize abrasion and have sufficient stiffness to maintain a round shape when rolled up and be flat when unrolled. It must also be of sufficient width so as to prevent the upper length from contacting the lower length.

Figure 5A:
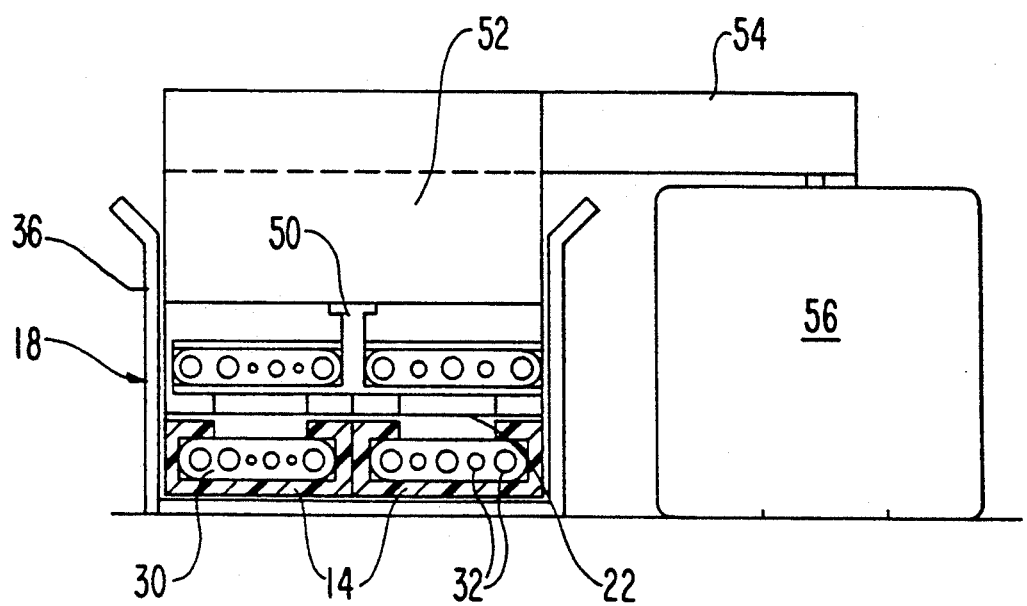
FIG. 5a shows a cross-sectional view of a dual line guiding assembly with two ribbons located between one assembly of two sets of upper and lower lengths.

FIG. 5a shows a cross-sectional view of a dual line guiding assembly with a wide ribbon 22 located between the upper 18 and lower 14 lengths of the reinforced assemblies. Also shown is a clamp 50 located between the upper lengths 18 that offers strain relief to the system that is provided in combination with the upper reinforcement channels. Such a clamp may be steel or aluminum and is positioned on a strain relief mount 52. Also shown is the drive arm 54 and linear drive 56.

Figure 6:
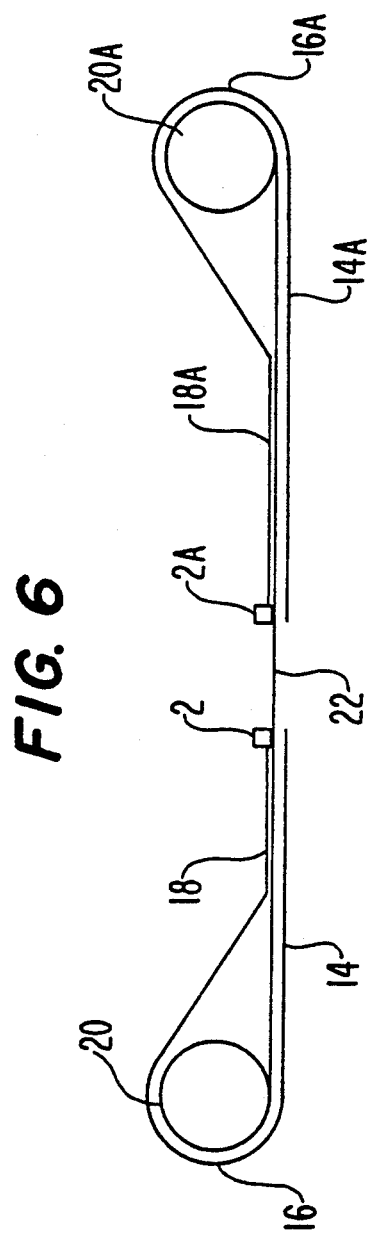
FIG. 6 shows a side view of a double ended system.

FIG. 6 shows a schematic side view of a double system where two line guiding assemblies face each other and operate in a synchronized fashion.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

I claim:
1. A line guiding assembly having a stationary piece of equipment and a moving piece of equipment comprising:
(a) a plurality of cables held together within an encapsulant and further held within reinforcement channels to form a reinforced line assembly;
(b) a trough holding said reinforced line assembly wherein said reinforced line assembly is positioned within the trough and looped back onto itself thereby forming a lower length, an upper length and a loop of the reinforced line assembly, wherein one of said lengths has an end which is affixed to the stationary piece of equipment and the other said length has an end which is affixed to the moving piece of equipment which is capable of moving in a longitudinal direction;
(c) a ribbon material located between and intermediate said upper and lower lengths of the reinforced assembly, said ribbon material capable of extending and retracting as said upper and lower lengths move so that the ribbon material prevents said upper and lower lengths from touching, and wherein the material comprising the ribbon material is different from the encapsulant and reinforcement channel of the line assembly; and
(d) a drum located within said loop of the line assembly wherein said ribbon material is affixed to the drum and wherein the drum rotates so as to roll up and unroll the ribbon material as the upper and lower lengths move within the channel.

2. A line guiding assembly of claim 1 wherein said encapsulant of the reinforced line assembly is polyurethane.

3. A line guiding assembly of claim 1 wherein said reinforcement channels of the reinforced line assembly is a polymeric material selected from the group including polyamides, and composites of polyamides and fluoropolymers.

4. A line guiding assembly of claim 3 wherein said fluoropolymers include polyethylene, fluorinated ethylene propylene, and perfluoroalkoxy resin.

5. A line guiding assembly of claim 1 wherein said trough is made of metal and is lined with an ultra-high molecular weight polyethylene.

6. A line guiding assembly of claim 1 wherein said ribbon material is made of a thin ribbon of stainless steel.

7. A line guiding assembly of claim 1 wherein said ribbon material is selected from the group consisting of beryllium copper, polyimides, cold rolled steel, and chrome-plated steel.

8. A line guiding assembly of claim 1 wherein said cables are selected from the group consisting of electrical cables, tubes, and fiber optics.

9. A double ended line guiding system comprising two line guiding assemblies facing each other, wherein each of said line guiding assemblies having a stationary piece of equipment and a moving piece of equipment comprises:
(a) a plurality of cables held together within an encapsulant and further held within reinforcement channels to form a reinforced line assembly;
(b) a trough holding said reinforced line assembly wherein said reinforced line assembly is positioned within the trough and looped back onto itself thereby forming a lower length, an upper length and a loop of the reinforced line assembly, wherein one of said lengths has an end which is affixed to the stationary piece of equipment and the other said length has an end which is affixed to the moving piece of equipment which is capable of moving in a longitudinal direction;
(c) a ribbon material located between and intermediate said upper and lower lengths of the reinforced assembly, said ribbon material capable of extending and retracting as said upper and lower lengths move so that the ribbon material prevents said upper and lower lengths from touching, and wherein the material comprising the ribbon material is different from the encapsulant and reinforcement channel of the line assembly; and
(d) a drum located within said loop of the line assembly wherein said ribbon material is affixed to the drum and wherein the drum rotates so as to roll up and unroll the ribbon material as the upper and lower lengths move within the channel.

10. A dual line guiding assembly comprising two line guiding assemblies held together within a single trough, wherein each of said line guiding assemblies having a stationary piece of equipment and a moving piece of equipment comprises:

(a) a plurality of cables held together within an encapsulant and further held within reinforcement channels to form a reinforced line assembly;

(b) a trough holding said reinforced line assembly wherein said reinforced line assembly is positioned within the trough and looped back onto itself thereby forming a lower length, an upper length and a loop of the reinforced line assembly, wherein one of said lengths has an end which is affixed to the stationary piece of equipment and the other said length has an end which is affixed to the moving piece of equipment which is capable of moving in a longitudinal direction;

(c) a ribbon material located between and intermediate said upper and lower lengths of the reinforced assembly, said ribbon material capable of extending and retracting as said upper and lower lengths move so that the ribbon material prevents said upper and lower lengths from touching, and wherein the material comprising the ribbon material is different from the encapsulant and reinforcement channel of the line assembly; and (d) a drum located within said loop of the line assembly wherein said ribbon material is affixed to the drum and wherein the drum rotates so as to roll up and unroll the ribbon material as the upper and lower lengths move within the channel.

11. A double line guiding assembly of claim 10 further comprising a strain relief clamp holding said upper lengths of said two line guiding assemblies.

* * * * *